United States Patent [19]
Genise

[11] Patent Number: 5,487,005
[45] Date of Patent: Jan. 23, 1996

[54] METHOD/SYSTEM FOR DETERMINATION OF GROSS COMBINED WEIGHT OF VEHICLES EQUIPPED WITH ELECTRONIC DATA LINKS

[75] Inventor: Thomas A. Genise, Dearborn, Mich.

[73] Assignee: Eaton Corporation, Cleveland, Ohio

[21] Appl. No.: 285,467

[22] Filed: Aug. 3, 1994

Related U.S. Application Data

[63] Continuation-in-part of Ser. No. 192,522, Feb. 7, 1994.

[51] Int. Cl.$^6$ .............. G06F 19/00; G06G 7/00; F16H 59/48; F16H 59/30
[52] U.S. Cl. .............. 364/424.1; 477/120; 477/904; 477/124; 477/70; 477/78; 477/91; 477/900; 14/335
[58] Field of Search .............. 364/424.1, 424.01, 364/426.02, 426.03; 477/120, 129, 155, 97, 900, 78, 70, 124, 129, 905, 131, 118, 904; 74/335, 336 R; 475/158; 192/103 C, 3.52, 3.58; 180/197, 65.2, 243, 249, 248, 282; 73/118.1

[56] References Cited

U.S. PATENT DOCUMENTS

| | | | |
|---|---|---|---|
| 4,361,060 | 11/1982 | Smyth | 477/120 |
| 4,595,986 | 7/1986 | Daubenspeck et al. | 364/424.1 |
| 4,648,290 | 3/1987 | Dunkley et al. | 477/78 |
| 5,053,959 | 10/1991 | Genise | 364/424.1 |
| 5,053,961 | 10/1991 | Genise | 364/424.1 |
| 5,053,962 | 10/1991 | Genise | 364/424.1 |
| 5,089,965 | 2/1992 | Braun | 364/424.1 |
| 5,117,933 | 6/1992 | Sigl et al. | 364/426.02 |
| 5,133,229 | 7/1992 | Asada et al. | 364/424.1 |
| 5,166,879 | 11/1992 | Greene et al. | 364/424.1 |
| 5,168,955 | 12/1992 | Naito | 364/426.03 |
| 5,172,609 | 12/1992 | Nitz et al. | 477/97 |
| 5,193,887 | 3/1993 | Bleckmann et al. | 364/426.03 |
| 5,231,582 | 7/1993 | Takahashi et al. | 364/424.1 |
| 5,231,897 | 8/1993 | Morita | 477/120 |
| 5,241,476 | 8/1993 | Benford et al. | 364/424.1 |
| 5,272,939 | 12/1993 | Markyvech et al. | 364/414.1 |
| 5,301,768 | 4/1994 | Ishikawa et al. | 363/424.1 |
| 5,335,566 | 8/1994 | Genise et al. | 364/424.1 |

Primary Examiner—Kevin J. Teska
Assistant Examiner—Jacques H. Louis-Jacques
Attorney, Agent, or Firm—Howard D. Gordon

[57] ABSTRACT

A control system/method for controlling a vehicular, at least partially automated system (110) separate from the vehicular transmission system (10), such as a CTIS or ABS, is provided. The at least partially automated system is controlled as a function of a value (GCW) approximating vehicle gross combined weight and determined as a function of information on the vehicle electronic data link (DL).

16 Claims, 5 Drawing Sheets

METHOD/SYSTEM FOR DETERMINATION OF GROSS COMBINED WEIGHT OF VEHICLES EQUIPPED WITH ELECTRONIC DATA LINKS

BACKGROUND OF THE INVENTION

Related Applications

This application is a continuation-in-part of and is related to U.S. Ser. No. 08/192,522, now pending, entitled METHOD/SYSTEM TO DETERMINE GROSS COMBINATION WEIGHT OF VEHICLES, filed Feb. 7, 1994, and assigned to the same assignee, EATON CORPORATION, as is this application.

This application is related to U.S. Ser. No. 08/225,271, now pending, entitled ENGINE DECELERATION DETERMINATION METHOD/SYSTEM, filed Apr. 8, 1994, and assigned to the same assignee, EATON CORPORATION, as is this application.

This application is related to U.S. Ser. No. 08/242,825, now pending entitled ENGINE FLYWHEEL TORQUE DETERMINATION METHOD/SYSTEM, filed May 16, 1994, and assigned to the same assignee, EATON CORPORATION, as is this application.

This application is related to U.S. Ser. No. 08/242,824, now pending, entitled ENGINE ACCESSORY TORQUE AND ENGINE DECELERATION RATE DETERMINATION METHOD/SYSTEM, filed May 16, 1994, and assigned to the same assignee, EATON CORPORATION, as is this application.

Field of Invention

This invention relates to systems/methods for determining a value indicative of vehicular gross combined weight (GCW) in vehicles equipped with electronic data links and manual transmission systems. In particular, the present invention relates to a system/method for determining the GCW of vehicles, such as heavy-duty trucks or coaches, equipped with an electronic databus carrying engine torque information, such as a databus conforming to the CAN, SAE J1922 and/or SAE J1939 protocol, and requiring only a means for sensing a value (OS) indicative of transmission output shaft speed or vehicle ground speed. More particularly, the present invention relates to a system/method for determining vehicular GCW in a vehicle having a databus preferably carrying information indicative of drivewheel torque, engine speed and transmission output shaft speed.

Description of the Prior Art

It is known in the prior art to provide various scale systems for vehicles wherein a control parameter indicative of vehicle weight, or at least of the weight of the vehicle load, may be measured. See, e.g., U.S. Pats. No. 4,714,122; 4,728,922; 5,014,206 and 4,839,835, the disclosures of which are incorporated herein by reference.

These systems required scale or other weighing systems which were costly to provide and/or maintain and were best suited for vehicles, such as garbage trucks or dump trucks, involved in special haulage applications, such as commercial refuse disposal or the like.

The prior art did not provide a relatively simple and inexpensive system/method for heavy-duty vehicles, especially heavy-duty vehicles equipped with manual transmissions and an SAE J1922- or J1939-type databus on which engine torque, preferably also engine speed and transmission output shaft speed, information is furnished for providing a value indicative of approximate current vehicle GCW.

By way of example, in a heavy-duty truck or tractor-semi-trailer vehicle, vehicle GCW may vary in a range of from about 10,000 pounds up to about 80,000 pounds or more, depending upon vehicle type and load. It is highly desirable to inform the vehicle operator of at least approximate current GCW and/or to provide this information to other vehicle systems such as, e.g., a fleet management system, a variable suspension system, an onboard central tire inflation system (CTIS), an antilock brake system (ABS) or the like.

SUMMARY OF THE INVENTION

In accordance with the present invention, the drawbacks of the prior art are minimized or overcome by the provision of a relatively simple and inexpensive system/method for determining approximate (within about 2,000–3,000 pounds) current vehicular GCW. The system determines approximate current vehicular GCW primarily, preferably entirely, using information and sensors usually already provided in vehicles with electronically controlled engines and electronic data links (SAE J1922, J1939 or similar protocol).

The GCW of a vehicle may be determined from known drive train characteristics (transmission ratio, axle ratio, tire radius, etc.), engine torque and vehicle acceleration measured at time $t_1$ and $t_2$ if $t_1$ and $t_2$ are relatively close (within seconds). This may be expressed as:

$$GCW = (T_1 - T_2) \div ((A_1 - A_2) \times C)$$

where:

$T_i$ = Wheel torque at time $t_i$;

$A_i$ = Vehicle acceleration at time $t_i$; and

C = Wheel rolling radius÷gravity constant.

It was found in practice (while applying this theory in an actual vehicle) that the "farther away" in magnitude points 1 and 2 are from one another, the more accurate the calculation. For example, $T_1$ may be zero, which makes At perhaps negative, while $T_2$ is rather large, making $A_2$ also relatively large and positive. However, from the assumptions made while deriving the function, points 1 and 2 cannot occur very far apart in time (four seconds was used in practice). To achieve this condition, the determination is performed only during an upshift. More specifically, time point 1 is preferably the instant during an upshift immediately before the transmission is shifted from neutral into the new gear. Time point 2 then may be any point after power is sufficiently reapplied after completion of the shift for up to four seconds after time point 1.

According to the present invention, to minimize the effects of "noise" in the system, driveline torsionals, etc., it is desired to measure/determine wheel torque T and vehicle acceleration A at as widely separated points as possible, without being unduly separated by time (four seconds has been found to be a maximum time separation for determining GCW in a heavy-duty truck or tractor-semitrailer vehicle). It also is desirable to take a continuing series of readings to maintain an average, preferably a mildly filtered average, value for GCW.

To accomplish the above, during an upshift, time $t_0$ is taken as the moment just prior to engaging the new gear ratio, when $T_0$ will equal zero. Upon engagement of the new gear ratio and achieving a minimum vehicle acceleration, vehicle acceleration ($A_i$) and drivewheel torque ($T_i$) are measured at relatively short intervals (about 40 milliseconds) for a period of time not exceeding about four seconds, and each compared to the to values to calculate a series of GCW values, which are then averaged by a mildly filtered running average technique.

Preferably, the vehicle will be equipped with a sensor for sensing a value indicative of transmission output shaft speed, vehicle acceleration (A) is preferably determined as a function of the rate of change of transmission output shaft speed (dOS/dt), and drivewheel torque (T) is preferably determined or derived from a reading of engine torque from the electronic engine data bus and factors such as transmission gear ratio, axle ratio and drive train efficiency. Vehicles having an SAE J1939-type data link, or databus, typically are equipped with a transmission output shaft speed sensor.

In vehicles equipped with an ABS or similar system, wheel speed signals from the systems, or on a databus, may be used to approximate output shaft speed and eliminate the need for an output shaft speed sensor. Alternatively, a signal from the vehicle speedometer may be used to determine vehicle acceleration and engaged transmission ratio.

Accordingly, it is an object of the present invention to provide a relatively simple, inexpensive and reliable control system/method for determining approximate current vehicular GCW on vehicles equipped with an electronic data link and an electronically controlled engine.

This and other objects and advantages of the present invention will become apparent from a reading of the detailed description of the preferred embodiment taken in connection with the attached drawings.

DESCRIPTION OF THE PREFERRED EMBODIMENT

Figures 1, 1A:
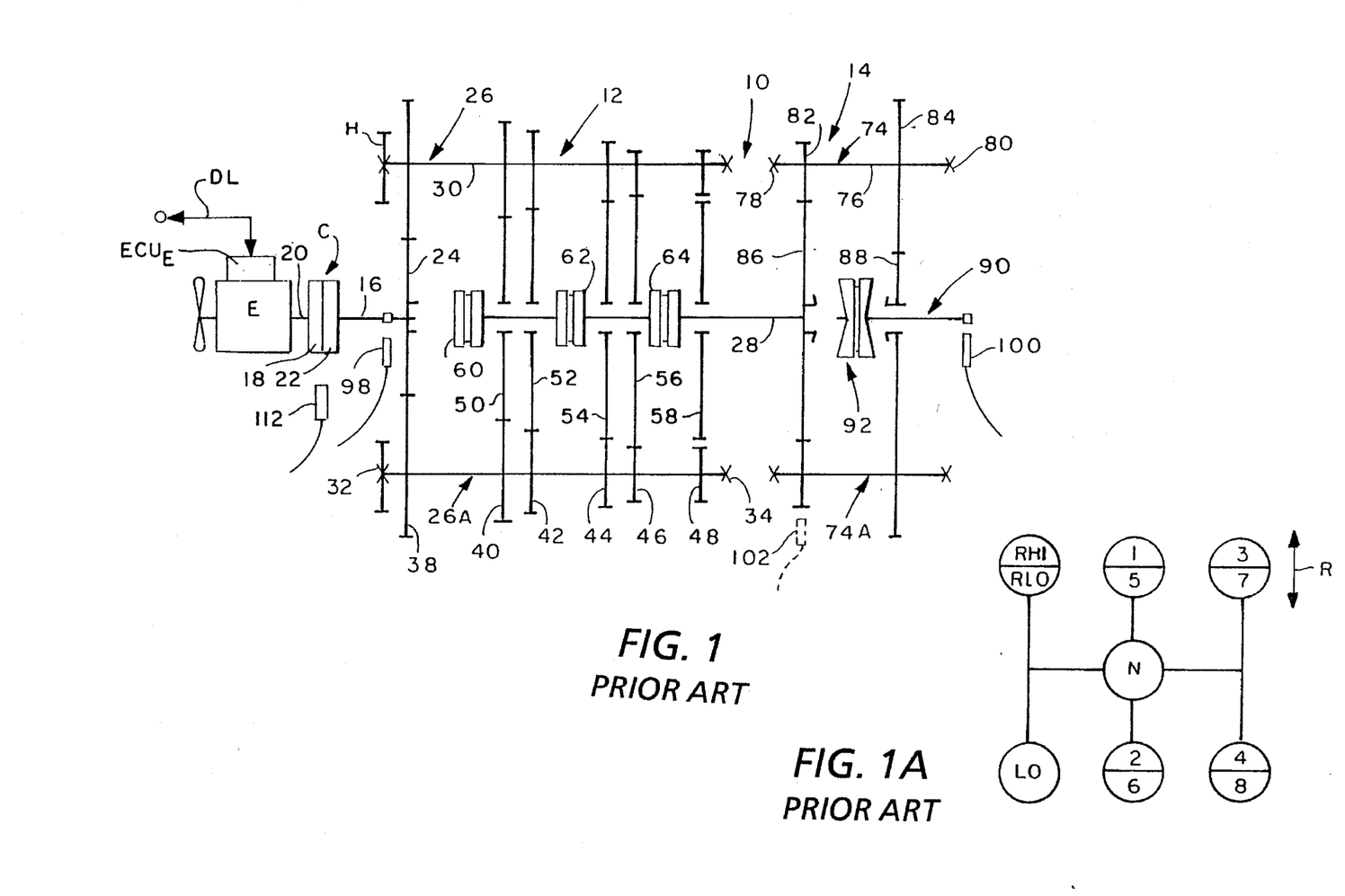
FIG. 1 is a schematic illustration of a vehicular drivetrain including a manual mechanical transmission, an electronic data link and an electronically controlled engine of the type advantageously utilizing the system/method of the present invention.
FIG. 1A is a schematic illustration of the shift pattern of the transmission of FIG. 1.

Certain terminology will be used in the following description for convenience in reference only and will not be limiting. The words "upwardly," "downwardly," "rightwardly," and "leftwardly" will designate directions in the drawings to which reference is made. The words "forward" and "rearward" will refer respectively to the front and rear ends of the transmission as conventionally mounted in a vehicle, being respectfully from left and right sides of the transmission as illustrated in FIG. 1. The words "inwardly" and "outwardly" will refer to directions toward and away from, respectively, the geometric center of the device and designated parts thereof. Said terminology will include the words specifically mentioned above, derivatives thereof and words of similar import.

The term "compound transmission" is used to designate a change speed or change gear transmission having a multiple forward speed main transmission section and a multiple speed auxiliary transmission section connected in series whereby the selected gear reduction in the main transmission section may be compounded by further selected gear reduction in the auxiliary transmission section. "Synchronized clutch assembly" and words of similar import shall designate a clutch assembly utilized to nonrotatably couple a selected gear to a shaft by means of a positive clutch in which attempted engagement of said clutch is prevented until the members of the clutch are at substantially synchronous rotation. A relatively large capacity friction means are utilized with the clutch members and are sufficient, upon initiation of a clutch engagement, to cause the clutch members and all members rotating therewith to rotate at substantially synchronous speed. The term "upshift" as used herein, shall mean the shifting from a lower speed gear ratio into a higher speed gear ratio.

For purposes of illustration, the vehicular GCW determination method/system of the present invention is disclosed as associated with a vehicular drivetrain including a manual mechanical transmission and an electronically controlled engine having a CAN, SAE J1922 or SAE J1939 type data link. It is understood that the vehicular GCW determination system/method of the present invention also may be advantageously utilized with other types of vehicular drivetrain systems.

Referring to FIG. 1, a vehicle drivetrain including a manual range type compound transmission 10 and an electronically controlled internal combustion engine E is illustrated. Compound transmission 10 comprises a multiple speed main transmission section 12 connected in series with a range type auxiliary section 14. Transmission 10 is housed within a housing H and includes an input shaft 16 driven by a prime mover such as diesel engine E through a selectively disengaged, normally engaged friction master clutch C having an input or driving portion 18 drivingly connected to the engine crankshaft 20 and a driven portion 22 rotatably fixed to the transmission input shaft 16.

The engine E is fuel throttle controlled, preferably electronically, and is connected to an electronic data link DL of the type defined in SAE J1922 and/or SAE J 1939 protocol, and the master clutch C is manually controlled by a clutch pedal (not shown) or the like. Typically, electronically controlled engine E will be provided with its own electronic control unit ECU$_E$. An input shaft brake (not shown), operated by manual overtravel depression of the clutch pedal, may be provided to provide quicker manual upshifting as is well known in the prior art. It is understood that a data link, or databus DL, complying with SAE J1939 protocol, or similar protocol, will carry information indicative of engine torque, engine speed and transmission output shaft speed.

Transmissions similar to mechanical transmission 10 are well known in the prior art and may be appreciated by reference to U.S. Pat. Nos. 3,105,395; 3,283,613 and 4,754,665, the disclosures of which are incorporated by reference.

In main transmission section 12, the input shaft 16 carries an input gear 24 for simultaneously driving a plurality of substantially identical countershaft assemblies 26 and 26A at substantially identical rotational speeds. The two substantially identical countershaft assemblies are provided on diametrically opposite sides of mainshaft 28 which is generally coaxially aligned with the input shaft 16. Each of the countershaft assemblies comprises a countershaft 30 supported by bearings 32 and 34 in housing H, only a portion of which is schematically illustrated. Each of the countershafts is provided with an identical grouping of countershaft gears 38, 40, 42, 44, 46 and 48, fixed for rotation therewith. A plurality of mainshaft gears 50, 52, 54, 56 and 58 surround the mainshaft 28 and are selectively clutchable, one at a time, to the mainshaft 28 for rotation therewith by sliding clutch collars 60, 62 and 64 as is well known in the prior art. Clutch collar 60 may also be utilized to clutch input gear 24 to mainshaft 28 to provide a direct drive relationship between input shaft 16 and mainshaft 28.

Typically, clutch collars 60, 62 and 64 are axially positioned by means of shift forks associated with the shift bar housing assembly 70, as well known in the prior art. Clutch collars 60, 62 and 64 may be of the well known nonsynchronized double acting jaw clutch type. As is well known, the clutch collars are shifted forwardly and rearwardly by shift forks controlled by a shift lever 70A. See U.S. Pats. No. 4,543,843; 4,567,785 and 4,788,889, the disclosures of which are incorporated herein by reference.

Mainshaft gear 58 is the reverse gear and is in continuous meshing engagement with countershaft gears 48 by means of conventional intermediate idler gears (not shown). It should also be noted that while main transmission section 12 does provide five selectable forward speed ratios, the lowest forward speed ratio, namely that provided by drivingly connecting mainshaft drive gear 56 to mainshaft 28, is often of such a high gear reduction it has to be considered a low or "creeper" gear which is utilized only for starting of a vehicle under severe conditions and is not usually utilized in the high transmission range. Accordingly, while main transmission section 12 does provide five forward speeds, it is usually referred to as a "four plus one" main section as only four of the forward speeds are compounded by the auxiliary range transmission section 14 utilized therewith.

Jaw clutches 60, 62, and 64 are three-position clutches in that they may be positioned in the centered, nonengaged position as illustrated, or in a fully rightwardly engaged or fully leftwardly engaged position by means of actuator 70. As is well known, only one of the clutches 60, 62 and 64 is engageable at a given time and main section interlock means (not shown) may be provided to lock the other clutches in the neutral condition.

Auxiliary transmission range section 14 includes two substantially identical auxiliary countershaft assemblies 74 and 74A, each comprising an auxiliary countershaft 76 supported by bearings 78 and 80 in housing H and carrying two auxiliary section countershaft gears 82 and 84 for rotation therewith. Auxiliary countershaft gears 82 are constantly meshed with and support range/output gear 86 while auxiliary section countershaft gears 84 are constantly meshed with output gear 88.

A two-position synchronized jaw clutch assembly 92, which is axially positioned by means of a shift fork (not shown) and the range section shifting actuator assembly 96, is provided for clutching either gear 86 to output shaft 90 for direct or high range operation or gear 88 to output shaft 90 for low range operation of the compound transmission 10. The "shift pattern" for compound range type transmission 10 is schematically illustrated in Figure A.

Range section actuator 96 may be of the type illustrated in U.S. Pat. Nos. 3,648,546; 4,440,037 and 4,614,126, the disclosures of which are hereby incorporated by reference.

For purposes of determining vehicular GCW and/or for providing information to other vehicle systems, an input shaft speed sensor 98, an engine speed sensor 99 and/or an output shaft speed sensor 100 may be utilized. Alternatively to output shaft speed sensor 100, a sensor 102 for sensing the rotational speed of auxiliary section countershaft gear 82 may be utilized. The rotational speed of gear 82 is, of course, a known function of the rotational speed of mainshaft 28 and, if clutch 92 is engaged in a known position, a function of the rotational speed of output shaft 90. As is well known (see above-mentioned U.S. Pat. No. 4,361,060), the signals (OS) from speed sensor 100 or other sensors may be differentiated with respect to time to provide signals (dOS/dt) having a value indicative of vehicle acceleration and the like. The ECU 106 will, preferably, include logic elements or rules for differentiating various input signals with respect to time.

Figure 2:
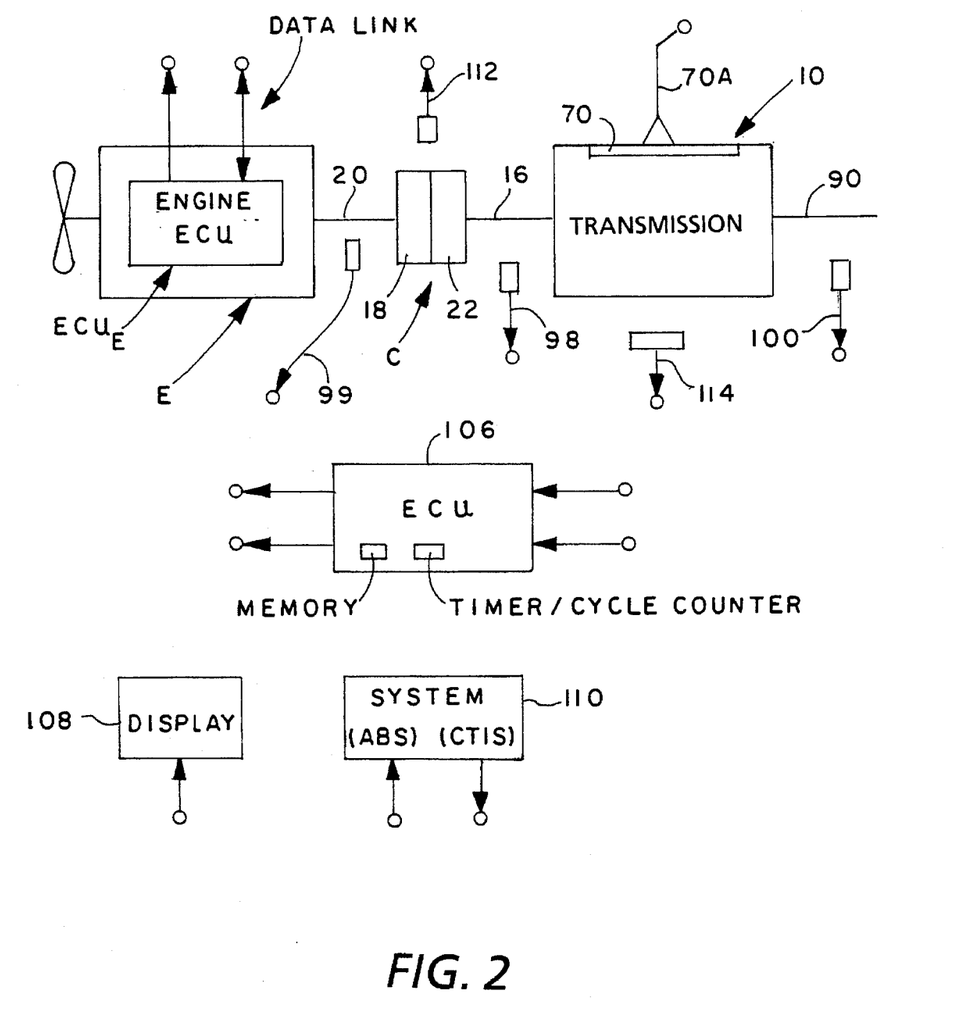
FIG. 2 is a schematic illustration of the vehicular GCW determination system of the present invention.

The ECU 106 may be of the type illustrated in U.S. Pat. No. 4,595,986, the disclosure of which is incorporated herein by reference. The ECU is effective to process the inputs in accordance with predetermined logic rules to issue command output signals to a display unit 108 and/or to other systems 110 such as an ABS system or a CTIS system or the like. As an alternative to a separate ECU for GCW determination, the logic rules for determining vehicle GCW may be in the engine ECU ($ECU_E$) or another system ECU.

Sensors 112 and/or 114 may be provided for sensing the condition of clutch C and/or transmission 10, respectively. The output of the sensors, especially of sensors 99 and 100, may be carried by the data link DL.

Output shaft speed sensor 100 may be replaced by a wheel speed signal from an ABS system and/or by sensors indicating input shaft speed and transmission gear ratio (ES=IS=OS * GR) and/or by a signal indicative of vehicle speed such as from the vehicle speedometer. Input shaft speed (IS) may be taken as equal to engine speed (ES), available on datalink DL, when clutch C is fully engaged. Gear ratio (GR) may be calculated from output shaft and input shaft speed (GR=IS/OS). By way of example, engaged gear ratio may be determined when ES (=IS) equals QS * GR, for a known GR, over a predetermined period of time. Similarly, output shaft speed may be determined from input shaft speed and gear ratio (OS=IS/GR).

According to the present invention, a system/method is provided for determining vehicular GCW using existing information from an electronic engine (SAE J1922 or J1939 protocol) data link or using information indicative of engine/drivewheel torque and a signal indicative of vehicle or output shaft speed.

It can be mathematically proven that for two times, $t_1$ and $t_2$, that are close to each other (within seconds):

$$T_1 - T_2 = C \times W \times (A_1 - A_2)$$

where:

$T_i$=Wheel torque at time $t_i$;

C=Rolling radius/gravity constant;

W=Gross combination weight; and $A_i$=Vehicle acceleration at time $t_i$.

The proof of this relationship is as follows:

$$F=mA$$

$$F_{WHEELS}RR-AD-GR=Accel\ R=mA$$

$$F_{WHEELS}RR+AD+GR+Accel\ R$$

where:

RR=Rolling resistance;

AD=Aerodynamic drag;

GR=Grade resistance;

Accel R=Acceleration resistance; and $F_{WHEELS}$=Force of road on drivewheels $$F_{WHEELS} = \text{torque at wheels} \div C_3 = \underbrace{C_1 \cdot W}_{RR} + \underbrace{C_2 \cdot V^2}_{AD} + \underbrace{\text{Grade} \cdot W}_{GR} + \underbrace{W \div g \cdot A}_{\text{Accel R}}$$

Multiply through by $C_3$:

$$T_w = C_4 \cdot W + C_5 \cdot V^2 + C_3 \cdot Grade \cdot W + C_3 \cdot (W \div g) \cdot A$$

$$At\, T_1: T_1 = C_4 \cdot W + C_5 \cdot V_1^2 + C_3 \cdot Grade \cdot W + C_3 \cdot (W \div g) \cdot A_1$$

$$At\, T_2: t_2 = C_4 \cdot W + C_5 \cdot V_2^2 + C_3 \cdot Grade \cdot W + C_3 \cdot (W \div g) \cdot A_2$$

Subtract second equation from first:

$$T_1 - T_2 = C_5 \cdot (V_1^2 - V_2^2) + C_3 \cdot W \div g \cdot (A_1 - A_2)$$

since $V_1 \approx V_2$ we can set $(V_1^2 - V_2^2) = 0$ If $C_3 \div g = C_6$, $$T_1 - T_2 = C_6 \cdot W \cdot (A_1 - A_2).$$

Based upon this relationship, a value approximating GCW may be determined from the expression:

$$GCW = W = (T_1 - T_2) + ((A_1 - A_2) * C)$$

To minimize the effects of "noise" and drivetrain torsionals and the like, it is desirable that the values of T and A be obtained when a maximum magnitude of difference exists, consistent with the conditions for deriving the expression, namely, that $t_1$ and $t_2$ be relatively close in time (four seconds has been selected as a maximum time difference for heavy-duty trucks based upon actual on vehicle testing experience).

Also, to minimize errors, a plurality of GCW values is determined with GCW equaling an average:

$$GCW = \frac{\sum_{i \geq 2}^{i} ((T_1 - T_i) \div ((A_1 - A_i) * C))}{(i - 1)}$$

Figure 3:
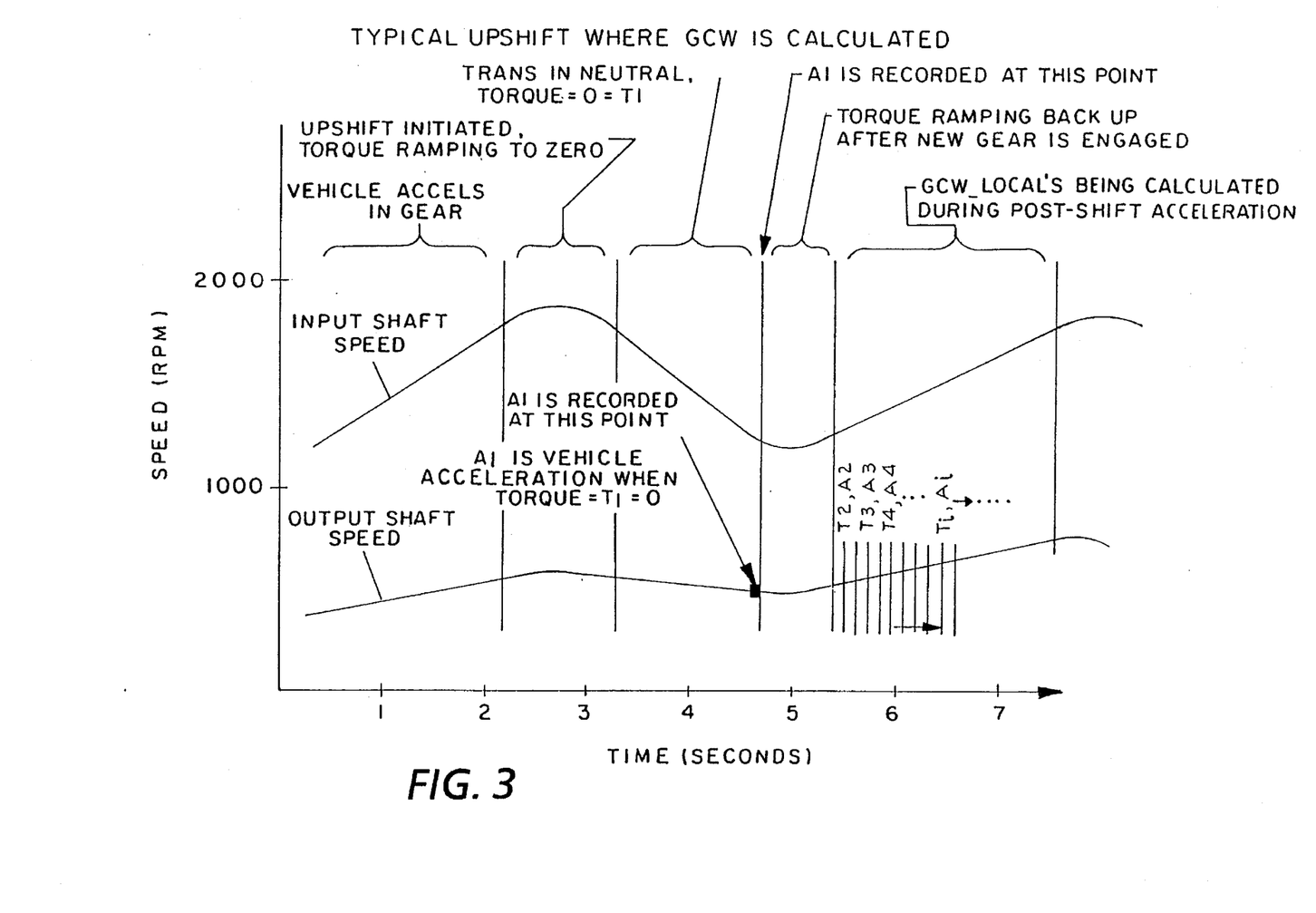
FIG. 3 is a graphical illustration of an upshift during which GCW is calculated according to the present invention.

A graphical representation of an upshift is seen in FIG. 3. It has been found that more accurate determinations of GCW may be obtained at completion of an upshift, especially if time $t_1$ is selected at the instant during an upshift immediately prior to engagement of the new ratio. At this instant, $T_1$, torque supplied from the engine to the drivewheels, is zero, and vehicle acceleration $A_1$ is a relatively low, possibly negative, value. Times $t_2, t_3 \ldots t_i$ may then be any point after engine power is sufficiently applied to the drivewheels through the vehicle powertrain for up to four seconds after time $t_1$.

In practice, a new $GCW_i$ is calculated about every 40 milliseconds after $t_2$ until about four seconds after $t_1$. The $GCW_i$ values are then preferably summed and averaged.

After time $t_1$, when the initial $A_1$ value is sensed, values of $A_2 \ldots_i$ and $T_2 \ldots_i$ will not be sensed until certain conditions are met, assuring that the subsequent values are different enough in magnitude from the time $t_1$ values to provide valid calculations for GCW. These conditions, determined from on-vehicle testing, are:

(1) $t_i$ is less than four seconds after $t_1$;

(2) the engine is operating at greater than a reference torque (about 19 percent of peak torque);

(3) vehicle acceleration is greater than a reference value (dOS/dt> about 20 RPM/sec.);

(4) input shaft speed greater than a reference value (IS>about 1,200 RPM for a heavy-duty diesel engine);

(5) vehicle acceleration has changed (dOS/dt at $t_2 \ldots_i$ $\neq$ dOS/dt at $t_1$); and (6) a shift is not in progress.

In practice, to get $T_i$, the drivewheel torque at time $t_i$, the engine torque is sensed, preferably from the electronic data link DL, and used to derive the drivewheel torque in a known manner. Generally, torque at wheels may be determined from the following:

| | |
|---|---|
| Torque at wheels = | (engine torque) * (gear ratio) * (axle ratio) * (drivetrain efficiency); |
| where engine torque = | [(percent engine torque) * (peak engine torque)] − [(torque to drive vehicle accessories) + (torque to accelerate engine)] |

To achieve even greater accuracy, it is desirable to sense engine flywheel torque ($T_{FW}$) from the relationship:

$$T_{FW} = T_{EG} - T_{BEF} - T_{ACCES} - T_{ACCEL}$$

where:

$T_{FW}$=engine flywheel torque;

$T_{EG}$=gross engine torque;

$T_{BEF}$=base engine friction torque (includes the torque to overcome engine internal friction and the torque to rotate the engine manufacturer-installed accessories (i.e., water pump, oil pump, etc.)):

$T_{ACCES}$=accessory torque (torque to operate vehicle accessories, such as air-conditioning, fans, lights, etc.); and $T_{ACCEL}$=torque to accelerate engine, calculated from engine acceleration or deceleration and moment of inertia (I) of engine.

According to the present invention, by utilizing an input signal indicative of transmission output shaft speed in combination with the other signals available on an electronically controlled data link DL, a value indicative of approximate vehicle GCW may be determined after a few upshifts of the vehicle. This value may be visually displayed to the operator by means of a display 108, or may be utilized as a control parameter to one or more vehicle systems 110 such as, e.g., an ABS system, an onboard tire inflation system, an active suspension system, a fleet management system, a driveby weigh system or the like.

Figure 4A:
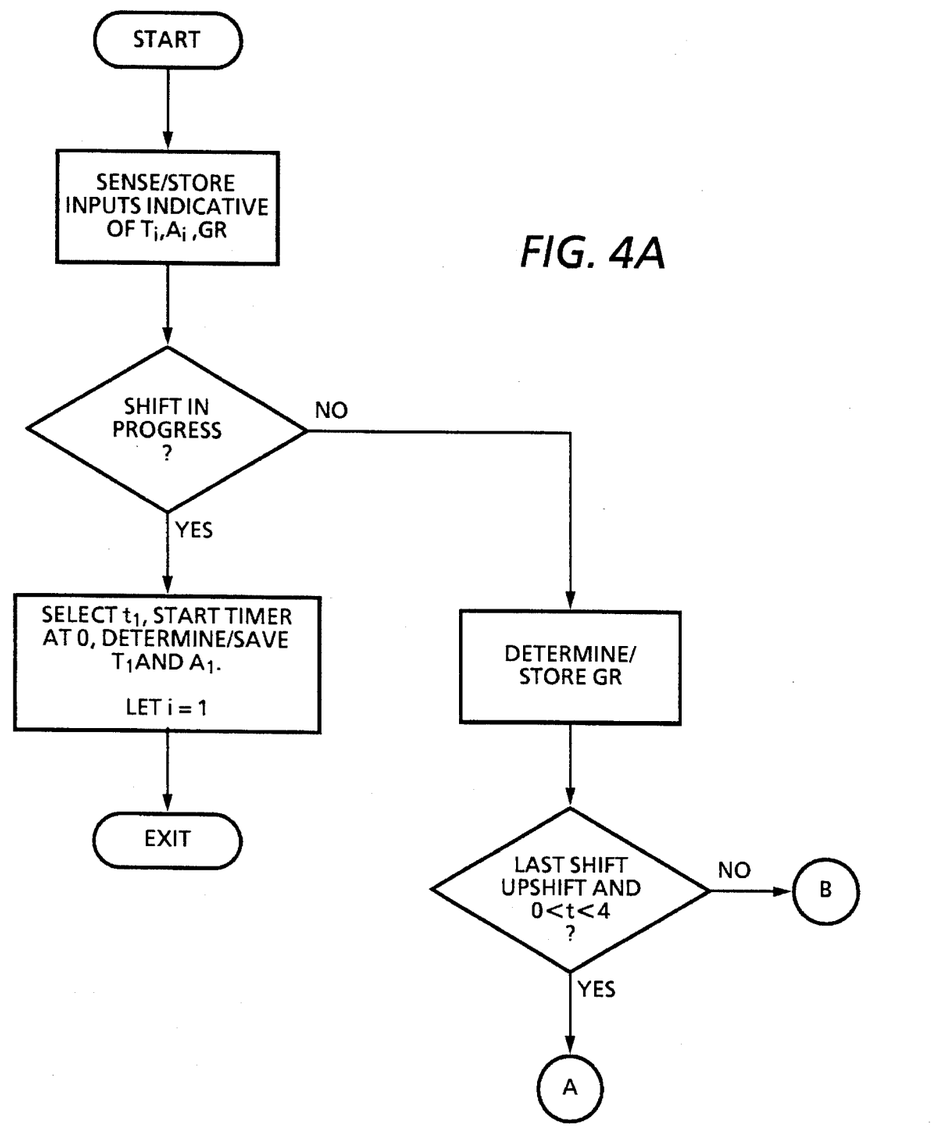
FIGS. 4A and 4B are schematic illustrations, in flow chart format, of the GCW determination method of the present invention.
Figure 4B:
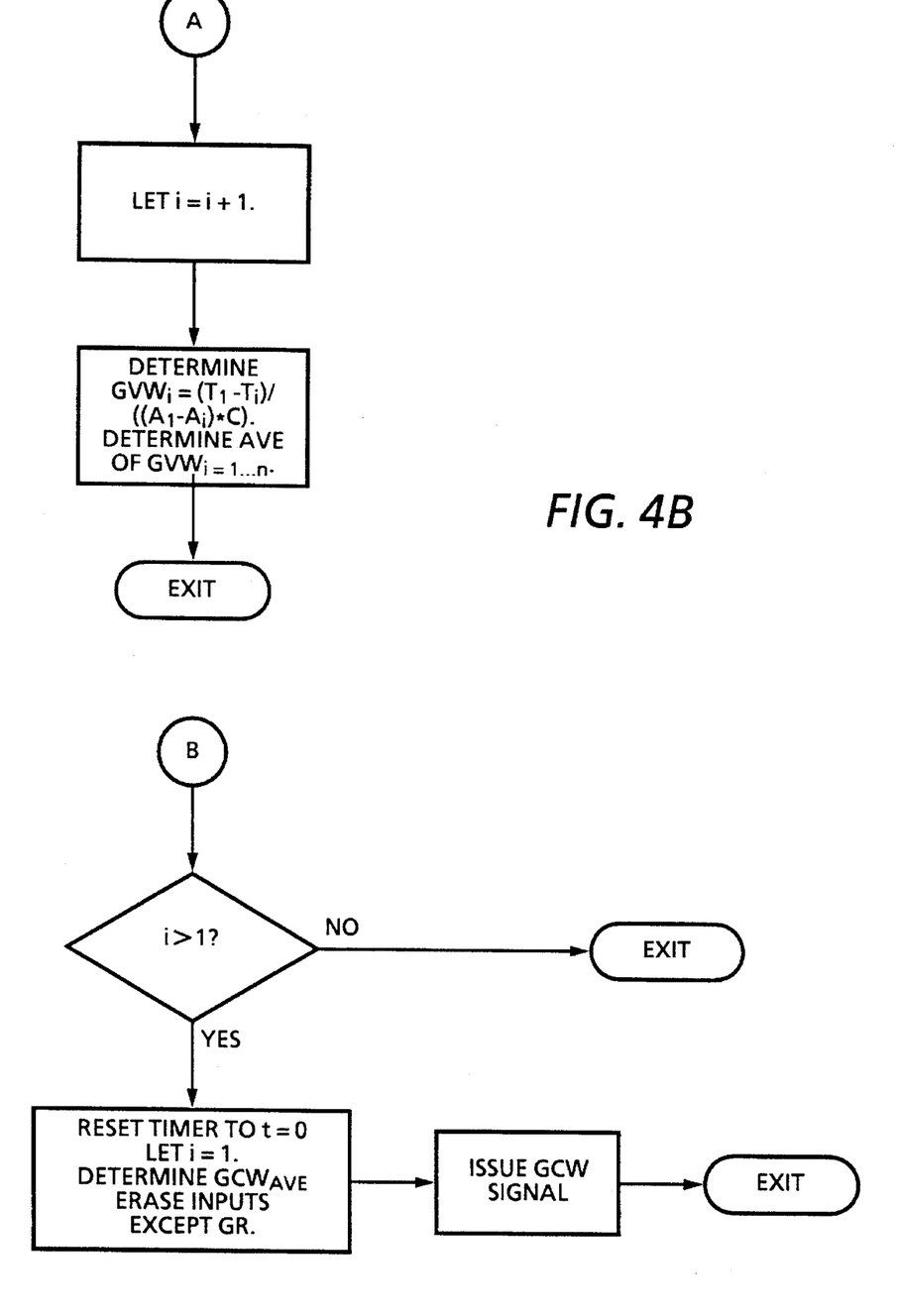

The vehicle GCW determination method of the present invention is schematically illustrated, in flow chart format, in FIGS. 4A and 4B.

Briefly, if a shift in progress is initially sensed, values possibly indicative of $T_1$ and $A_1$ are sensed and stored and a timer is started. Later, if an upshift is confirmed as being complete (i.e., compare previous to current GR as determined by IS/OS or sensor 114) within four seconds of starting the timer, a GCWi is completed. After four seconds from start of an upshift, an averaged value of GCW is determined.

Based upon field tests, after a few upshifts, an acceptably accurate value of GCW is determined.

Although the present invention has been described with a certain degree of particularity, it is understood that various changes to form and detail may be made without departing from the spirit and the scope of the invention as hereinafter claimed.

I claim:

1. On a vehicle equipped with an internal combustion engine, a change-gear transmission and an electronic data link carrying information indicative of engine torque, engine speed and vehicle ground speed, a control system for controlling an at least partially automated device separate from the transmission, said control system comprising:

a computing means for receiving input signals and processing same according to predetermined logic rules to issue output signals;

means allowing said computing means to access said data link;

means for sensing completion of shifts in said transmission;

memory means associated with said computing means and containing logic rules to determine, only immediately after completion of a transmission upshift, a value indicative of vehicle gross combined weight (GCW) as a function of information on said data link; and means for controlling said device as a function of said value.

2. The system of claim 1 wherein said engine is electronically controlled and said data link substantially conforms to the SAE J1922 or SAE J1939 protocol.

3. The system of claim 2 wherein said computing means comprises the engine processor ($ECU_E$).

4. The system of claim 1 wherein said computing means is effective to:

determine a value indicative of current drivewheel torque (T);

determine a value indicative of current vehicle acceleration (A); and determine said value indicative of current vehicular gross combined weight ($GCW_i$) as a function of the expression:

$$(T_1-T_i) \div ((A_1-A_i) * C)$$

where:

i=an integer greater than 1;

$T_1$=a value indicative of wheel torque at time $t_1$;

$T_1=0$;

$T_i$=a value indicative of wheel torque at time $t_i$~0;

$A_1$=a value indicative of vehicle acceleration at time $t_1$;

$A_i$=a value indicative of vehicle acceleration at time $t_i$;

C=constant related to gear ratio, drivetrain characteristics and gravity;

time $t_1$ is selected as a time immediately prior to engagement of the target gear ratio; and time $t_i$ is less than a reference time ($REF_{TIME}$) after time $t_1$.

5. The system of claim 1 wherein said device is a display.

6. The system of claim 1 wherein said device is a central tire inflation system.

7. The system of claim 1 wherein said device is an antilock brake system.

8. The system of claim 1 wherein said transmission is manually controlled.

9. For a vehicle equipped with an internal combustion engine, a change-gear transmission, an electronic data link carrying information indicative of engine torque, engine speed and vehicle ground speed, and computing means for receiving input signals and processing same according to predetermined logic rules to issue output signals, a method for controlling an at least partially automated device separate from the transmission, said method comprising:

allowing said computing means to access said data link;

sensing completion of shifts in said transmission;

determining, only immediately after completion of a transmission upshift, a value indicative of vehicle gross combined weight (GCW) as a function of information on said data link; and controlling said device as a function of said value.

10. The method of claim 9 wherein said engine is an electronically controlled engine and said data link conforms substantially to the SAE J1922 or SAE J1939 protocol.

11. The method of claim 9 wherein said device is an active suspension system.

12. The method of claim 9 wherein said device is an onboard central tire inflation system.

13. The method of claim 9 wherein said device is an antilock brake system.

14. The method of claim 9 wherein said determining a value indicative of current vehicle gross combined weight ($GCW_i$) is done as a function of the expression:

$$(T_1-T_i) \div ((A_1-A_i)*C)$$

where:

i=an integer greater than 1;

$T_1$=a value indicative of wheel torque at time $t_1$;

$T_i$=a value indicative of wheel torque at time $t_i$~$T_1$;

$A_1$=a value indicative of vehicle acceleration at time $t_1$;

$A_i$=a value indicative of vehicle acceleration at time $t_i$;

C=constant related to gear ratio, drivetrain characteristics and gravity;

time $t_i$ is less than a reference time ($REF_{TIME}$) after time $t_1$; and $GCW_i$ is determined only immediately after an upshift into a target gear ratio.

15. The method of claim 14 wherein time $t_1$ is selected as a time immediately prior to engagement of the target gear ratio.

16. The method of claim 9 wherein said transmission is manually controlled.

* * * * *